3,399,604
WATER PRESSURE ACTIVATED SWITCH
Glenn A. Shewmake, Trevilians, and Joseph L. Pentecost, Fairfax, Va., assignors to Melpar, Inc., Falls Church, Va., a corporation of Delaware
Filed July 25, 1966, Ser. No. 567,754
4 Claims. (Cl. 92—41)

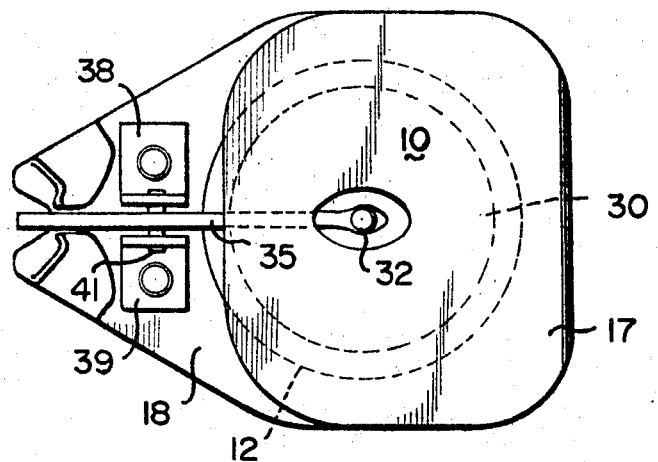
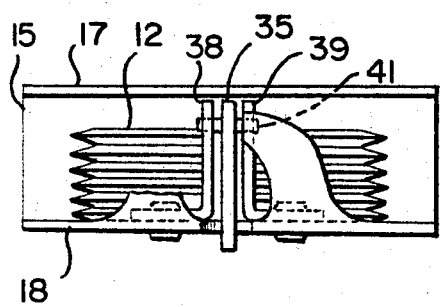
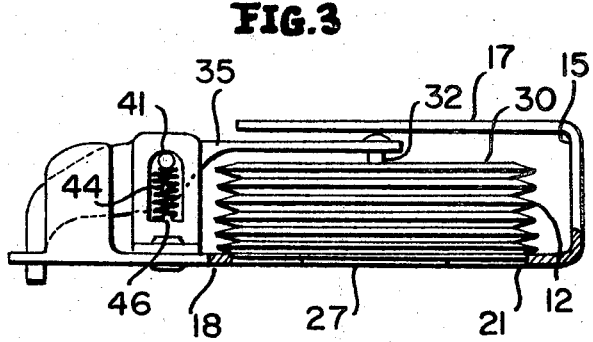
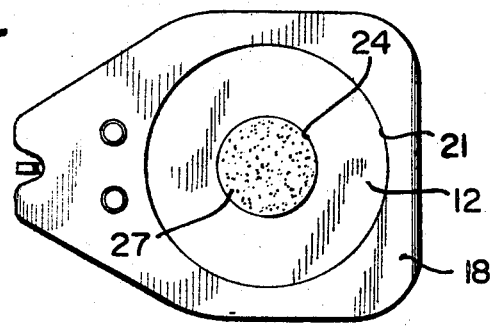

ABSTRACT OF THE DISCLOSURE

A water pressure activated switch includes a normally water-tight and gas-tight bellows supported by a bracket which permits relative freedom of movement of one end of the bellows, a linkage member being supported by the aforementioned end of the bellows for movement therewith in response to water pressure exerted along the axis of the bellows. The bellows contains an aperture which is covered by a membrane stretched taut thereacross and bonded along the wall of the bellows adjacent the aperture. The membrane is composed of a material pervious to gases but impermeable to water to permit gas pressure equalization internally and externally of the bellows while maintaining the sensitivity of the bellows to water pressure variations upon immersion of the entire switch into water. The switch is also provided with a mechanical linkage which is connected to the movable end of the bellows to counteract or absorb shock and vibration-inducing forces along the axis of the bellows produced by acceleration of the switch in either direction along that axis.

---

The present invention relates generally to pressure responsive devices and, more particularly, to a water pressure activated switch which is adapted to respond to pressure exerted thereon, when immersed in liquid to a preset depth, to actuate a cooperating device or mechanism for any purpose conventionally served by such a switch.

Among the wide range of uses of a water pressure activated switch are included the arming of mines, precise depth sounding, inflation of life preservers or other survival equipment upon immersion in water to a preset depth, actuation of marker buoys for apparatus or equipment which is intentionally or inadvertently submerged in water, such as fish nets, crustacean traps, dislodged outboard motors, or other nautical gear whose use necessarily subjects it to the possibility of accidental loss in relatively deep water. For such applications it is desirable to provide a pressure activated switch which is relatively insensitive to temperature variations or atmospheric pressure changes so that it may be precisely set to actuate the cooperating device when immersed in water to a predetermined depth.

Prior art devices utilizing pressure sensitive elements, such as bellows (aneroid devices) or piston and cylinder arrangements, are extremely temperature sensitive, altitude sensitive, and generally not sufficiently sensitive for shallow water immersion activation.

Accordingly, it is a principal object of the present invention to provide a water pressure activated switch which is practically insensitive to temperature variations and altitude or atmospheric pressure changes.

Briefly, in accordance with the present invention the water pressure activated switch includes a bellows or other expansible-compressible component responsive to pressure variations, the said component containing an aperture communicating between interior and exterior thereof, and the aperture covered with a semi-permeable membrane of a type which is penetratable by or permeable to air or other gases but impervious to water or other liquids. The membrane is supported such that it experiences no appreciable deflection upon immersion of the switch in water or other liquid. The bellows compresses with increasing immersion depth and may be set to directly actuate a mechanical linkage, trigger, system, or electrical switch, or may be connected to a mechanical linkage to change the extent of direction or rate of motion of a cooperating device, or for any other conventional purpose consistent with mechanical motion of the bellows. Since compression of the bellows, if sufficiently sensitive to depth variations and insensitive to factors unrelated to depth variations, is equatable to water pressure at any given depth of immersion of the switch, the switch may be preset to actuate the desired device at a predetermined depth. The provision of a semi-permeable membrane permits this presetting of the depth at which actuation is to occur to be extremely precise and unaffected by temperature or atmospheric pressure changes within and above the liquid medium in which the switch is immersed.

It is therefore another object of the present invention to provide a water pressure activated switch utilizing a bellows or other expansible-compressible means capable of permitting the passage of air or other gases from exterior to interior thereof to equalize air pressure or gas pressure changes caused by temperature, altitude or meteorological effects, while preventing the similar passage of water or other liquids in which the switch is to be immersed.

A further feature of the invention is the provision of a mechanical linkage coupled to the expansible-compressible member and pivoted on a spring loaded fulcrum to reduce the sensitivity of the switch to any acceleration or deceleration along the axis of pressure response, which would otherwise cause the expansible-compressible member to react to a factor unrelated to depth of immersion.

The above and still further objects, features and attendant advantages of the present invention will become apparent from a consideration of the following detailed description of a preferred embodiment thereof, especially when taken in conjunction with the accompanying drawing, in which:

FIGURE 1 is a plan view of a preferred embodiment of the water pressure activated switch;

FIGURE 2 is an end view of the switch of FIGURE 1;

FIGURE 3 is a side view of the switch of FIGURE 1; and

FIGURE 4 is a bottom view of the switch of FIGURE 1.

Referring now to the drawings, wherein like reference numerals are used to designate like components in the several views, the water pressure activated switch 10 includes a bellows 12 which operates in well known fashion to compress or expand under pressure applied in a direction parallel to its axis. The bellows may be formed from sheet metal which is rendered axially resilient by conventional construction in an accordion-like fashion or by a spring covered with suitable liquid-impervious, gas permeable material. Alternatively, other known types of expandible-compressible elements may be utilized.

Bellows 12 is mounted on a bracket or channel member 15 which contains a hole 21 in one of the spaced parallel plates 17, 18, thereof of sufficient diameter to accept the bellows in fastened relationship therewith. Any other conventional manner of fastening the bellows to the switch body may similarly be employed. The manner of fastening described above, however, has the specific advantage of exposing an aperture 24, in the end of the bellows projecting from hole 21 in plate 18, to the surrounding liquid medium upon immersion of switch 10 therein.

Aperture 24 is covered by a semi-permeable membrane 27, the membrane being composed of a material which is pervious to air or other gases but impervious to liquids, such as water. One suitable material having these characteristics is a 45–55 blend of butadiene-acrylonitrile copolymer and polyvinyl chloride, described in detail by Satas, in the publication "Porous Sprayed Sheets and Coatings," Industrial and Engineering Chemistry, vol. 57, No. 4 (April 1965), pp. 38–42. Other examples of materials suitable for use as membrane 27 are those marketed under the trade name "Vapotex" by Aldan Rubber Company of Philadelphia, Pa. Membrane 27 may be supported in any convenient manner such that it is taut relative to the end of the bellows at which is located, so that it experiences no appreciable deflection upon or during immersion of the switch into the liquid medium. Preferably, this is accomplished by fastening the membrane, while in a stretched condition, to the end surface of the bellows about the perimeter of aperture 21, using a conventional water insoluble cement.

Since axial pressure on bellows 12 increases with increasing submergence of the switch into the water, the upper end 30 of the bellows is designed to undergo a limited range of movement relative to its position prior to submergence of the switch, i.e. the change of length of the bellows may be limited to a predetermined amount, in accordance with the depth of submergence at which the switch is to be activated, to produce substantially linear motion during the increasing submergence. The specific motion of the bellows, however, whether linear or nonlinear, is not essential to the operation of the switch, because actuation may be set to occur at a bellows length commensurate with the pressure existing at a predetermined depth of immersion. Since membrane 27 is permeable to air or other gases, the air or gas pressure is equalized internally and externally of the bellows so that the switch is insensitive to temperature variations or atmospheric pressure changes; yet highy sensitive to pressure variations caused by water pressure alone. Hence, the switch may be precisely set to actuate the cooperating device upon reaching a specific and predetermined depth of immersion in the liquid medium (e.g., water).

A projection 32 is axially disposed on bellows end 30 for coupling to a mechanical linkage or to the pressure contact of an electrical switch, for example, to produce the desired actuation. In order to reduce the sensitivity of the switch to acceleration that would otherwise cause compression of the bellows, a mechanical linkage is provided in which an arm 35 is arranged to follow the movement of projection 32, by pivotal coupling thereto, and is further coupled to a spring loaded fulcrum comprising a pair of brackets 38, 39, between which arm 35 is interposed and through which a pivot pin 41 extends. The brackets 38 and 39 may be riveted or otherwise fastened to the lower plate 18 of channel 15. A compression spring 44 is maintained in position between brackets 38, 39, by suitable bracket projections 46, to exert a force on pivot pin 41, thereby providing the spring loaded fulcrum effect. Acceleration of the switch in an upward direction, as viewed in FIGURE 3, therefore has negligible effect on the bellows because the spring loaded mechanical linkage 35 tends to counteract the force produced by the acceleration by exerting an opposing force.

The mechanical linkage may also be used for the desired actuation, upon finite compression of the bellows, to provide a shock and vibration insensitive coupling.

From the preceding description it will be observed that water pressure activated switches in accordance with the present invention are reliable and accurate, yet may be of extremely simple construction and may be manufactured at relatively low cost in quantity.

It will further be observed that the bellows may be replaced with a piston and cylinder arrangement or other expansible-compressible device so long as the semi-permeable membrane 27 is provided in an aperture forming a gas communicating path between interior and exterior thereof. The entire bellows or other compressible member may, of course, be covered with the semi-permeable membrane material if desired.

We claim:
1. A water pressure activated switch comprising hollow resilient means compressible under subjection to pressure along a preselected axis thereof, said resilient means having at least one aperture communicating between interior and exterior thereof, a membrane covering each said aperture, said membrane composed of a material pervious to gases and impermeable to water, said membrane stretched across the aperture which it covers and bonded to the wall of said resilient means immediately adjacent said aperture, means mounting said resilient means for exposure of said membrane and for freedom of relative movement of an end of said resilient means along said axis in response to said pressure, and means connected to said relatively movable end of said resilient means for counteracting shock and vibration-inducing forces along said axis produced by acceleration of said switch in either direction along said axis.

2. The combination according to claim 1 wherein said force-counteracting means includes a mechanical linkage adjacent said relatively movable end, said linkage including an arm coupled to said end, and a spring loaded fulcrum for pivotal motion of said arm remote from said end, said fulcrum coupled to said mounting means.

3. The combination according to claim 1 wherein said resilient means comprises a bellows.

4. A water pressure activated switch, comprising a normally water-tight and gas-tight bellows, a bracket supporting said bellows, for relative freedom of movement of one end thereof, a linkage member supported by said one end of said bellows for movement therewith in response to water pressure exerted along the axis of the bellows, an aperture in said bellows, a membrane stretched taut across said aperture and bonded along the wall of the bellows adjacent said aperture said membrane pervious to gases and impermeable to water to permit gas pressure equalization internally and externally of said bellows while maintaining the sensitivity of said bellows to water pressure variations upon immersion of said switch into water, and means for counteracting shock and vibration-inducing forces tending to produce relative movement of said one end of said bellows, in response to acceleration of said switch along the axis of compression of said bellows, said means including an arm coupled to said linkage member and a spring-loaded fulcrum for pivoting of said arm at a position remote from said one end of said bellows, said fulcrum mounted on said bracket.

References Cited
UNITED STATES PATENTS

| | | | |
|---|---|---|---|
| 522,972 | 7/1894 | Cuttriss | 200—140 |
| 1,416,210 | 5/1922 | Jung et al. | 92—40 X |
| 1,946,175 | 2/1934 | Murphy et al. | 92—40 X |
| 2,298,938 | 10/1942 | Griffin et al. | 220—44 |
| 2,611,057 | 9/1952 | Slonneger | 200—140 |
| 2,650,673 | 9/1953 | Bering et al. | 220—44 |
| 2,731,977 | 1/1956 | McGowen | 92—43 X |
| 3,216,326 | 11/1965 | Rice et al. | 92—34 X |
| 3,349,203 | 10/1967 | Wolford | 200—61.21 X |

MARTIN P. SCHWADRON, *Primary Examiner.*

I. C. COHEN, *Assistant Examiner.*